United States Patent [19]

Fineblum

[11] Patent Number: 4,971,026
[45] Date of Patent: Nov. 20, 1990

[54] SELF-CLEANING AIR FILTER SYSTEM

[76] Inventor: Solomon S. Fineblum, 112 Shady La., Randolph, N.J. 07869

[21] Appl. No.: 434,359

[22] Filed: Nov. 13, 1989

[51] Int. Cl.⁵ .............................................. F24H 3/02
[52] U.S. Cl. .................................. 126/110 R; 55/290
[58] Field of Search .................... 126/110 R, 116 R; 55/290, 350

[56] References Cited

U.S. PATENT DOCUMENTS 4,481,021  11/1984  Kinney et al. .......................... 55/290
4,521,230   6/1985  Strong .................................... 55/290

Primary Examiner—Carroll B. Dority

[57] ABSTRACT

This is a system for continuously cleaning warm-air furnace air filters by the reverse flow of air from the downstream, interior side of a portion of the filter to the upstream, exterior side of the filter which is rotating such that every portion of said filter is driven past the inlet of plenum or plenums at which locations reverse pressure generates reverse air flow to dislodge the dust and, thereby, clean and filter and to then drive the airborne duct into a fluid conduit which directs the collected dust into a combustion chamber, or into the exhaust vent pipe, or a dust receptacle. This assures a constantly clean filter, full air flow, and efficient heat transfer from heat exchanger into the occupied space requiring heat.

7 Claims, 8 Drawing Sheets

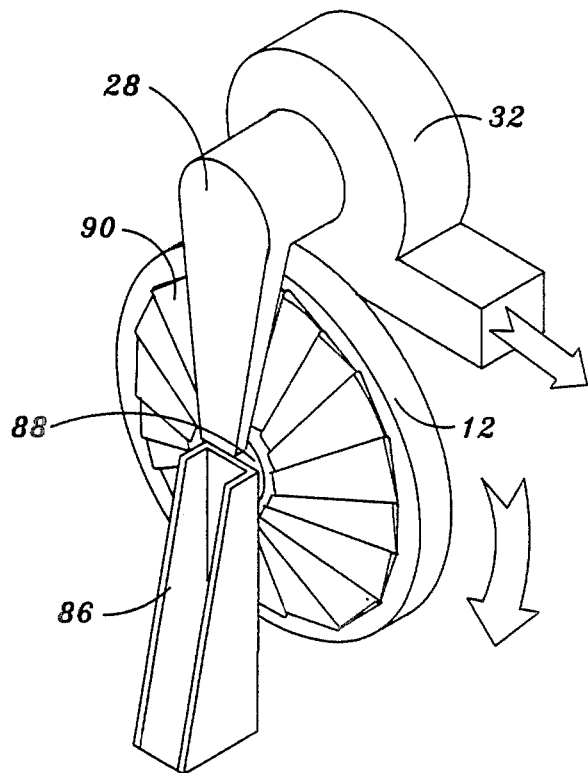
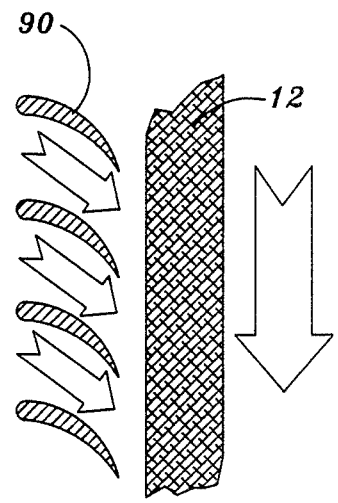
FIG. 6
FIG. 6A
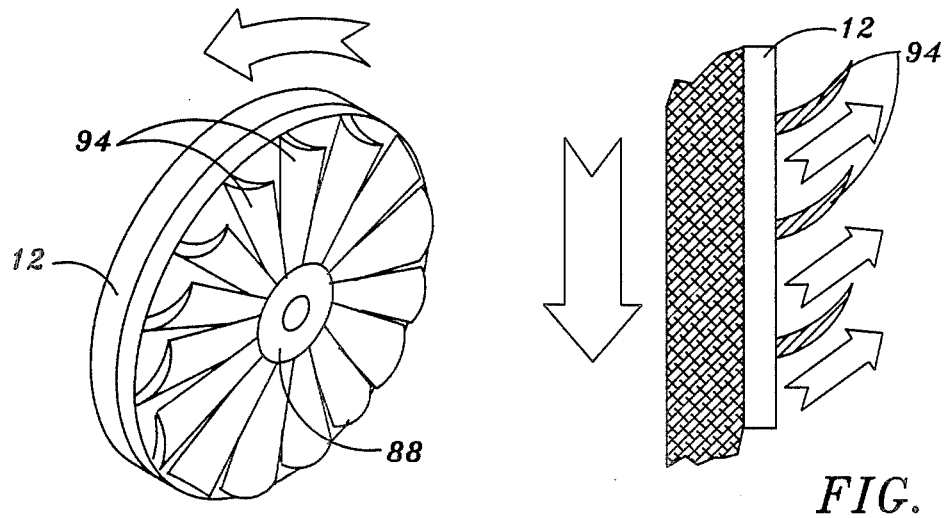
FIG. 7
FIG. 7A

SELF-CLEANING AIR FILTER SYSTEM

BACKGROUND OF THE INVENTION

1. The Field of the Invention

The present invention relates to a filter cleaning system for air handlers and, more specifically, to a system for automatically cleaning filters in warm-air furnaces, air conditioners and the like.

2. The Prior Art

In domestic warm-air furnaces, filters are periodically replaced by a new filter or occasionally they are cleaned and replaced. Clogged filters inhibit the full, proper air flow through the heat exchanger and thereby waste energy by poor heat exchanger efficiency and permit damaging overheating of heat exchanger.

Some self-cleaning filters exist; but the systems required are very complex and not directly compatible with warm-air furnaces.

F. Lang (U.S. Pat. No. 3,183,647) teaches a movable nozzle that oscillates across a moving filter element (or elements) to pick up by suction dust particles that have settled on the upstream face of the filter. There is no specific destiny for the dust particles and the general configuration of the device is not clearly compatible with present domestic warm-air furnaces while the present invention provides for specific means of dust disposal and is clearly compatible with present warm-air furnaces.

F. D. Noland (U.S. Pat. No. 4,082,524) teaches a method of cleaning a filter used to remove dust from the exhaust of a grain dryer by a rotating vacuum inlet and disposes the dust into a cleanable chamber. The purpose there and the required structure are different in form and function; the dust pickup moves rather than the filter. That device is not a practical adjunct to domestic warm-air furnaces or similar appliances.

Per Norbäch (U.S. Pat. No. 4,296,780) teaches a structure for cleaning a throttling device which consists of a "plurality of fine through passages for conveying air" so that the fine through passages do not get clogged. The dust pickup plenum rotates over a fixed filter while I teach a rotating filter past a fixed pickup plenum. Norbäch finally delivers the dust into the main stream while I teach the constant filtering of air, the perpetual cleaning of the filter, and convenient disposal of airborne dust away from the air stream.

W. L. Kinney, Jr. and R. E. Evans, Jr. (U.S. Pat. No. 4,481,021) teach a device with a rotating convoluted drum filter with suction pickups in the valleys of the convolutions of the filter media. There is no indication of method of disposal of dust and the device is not suitable for integration into, or use with, a typical warm-air furnace.

T. J. Retka and G. S. Wylie in an ASME Paper No. 86-GT-126 published by ASME, *Journal of Engineering for Gas Turbines and Power*, Jan. 1987, Vol. 109, pg. 79–84, describe a pulse-jet self-cleaning air filtration system for gas turbines which blows a blast of high pressure air in reverse direction to clean the filters when excessive pressure drop indicates that the filters are clogged. This is a large complex system that may be appropriate for the large installation described but neither suitable nor compatible with warm-air furnaces.

J. P. Murphy and H. Camplin in ASME paper 88-GT-85 describe a self-cleaning air filtration system for a U.S. Army battle tank which comprises a rotating cylindrical filter with high velocity jets that drive the dust from the upstream face into receiver plenums opposite the high velocity jets which accept and remove the dust. This system uses a cylindrical moving filter which is not readily compatible with the construction of conventional warm-air furnaces while the invention taught herein comprises a flat filter which is more compact and more compatible with conventional warm-air furnaces.

SUMMARY OF INVENTION

A rotating filter is mounted at the return air inlet of a warm-air furnace on a low-friction bearing. As the circular disc filter rotates, air flow is reversed in one section to force entrained particles to move upstream relative to the filter until the particles are dislodged from the filter and blown into a duct which is kept at a relatively low pressure and in which particles removed from the filter by reverse flow are driven into the combustion chamber, into the flue or into a cleanable or replaceable receptacle. The object of this invention is a simple, compact self-cleaning filter system with unobstructed air flow efficiently convecting heat from the heat exchanger into areas being heated. Another object is the prevention of overheating the heat exchanger which often results from deficient air flow. Another objective is the avoidance of necessity of replacing or cleaning air filters in warm-air furnaces and similar devices.

DESCRIPTION OF THE DRAWINGS

The foregoing as well as other objects, advantages and features of this invention will be more apparent from a description of the drawings, wherein:

FIGS. 2A and 2B are partial side sectional views of FIG. 2.

FIG. 5 shows details of gas and oil burners.

FIG. 6 shows a fluid dynamic filter drive with stators.

FIG. 6A shows an enlarged partial section of FIG. 6.

FIG. 7 shows a fluid dynamic filter drive with rotor blades.

FIG. 7A shows an enlarged patial section of FIG. 7.

FIG. 1 shows a warm-air furnace in one embodiment of the self-cleaning filter system taught herein. It comprises a furnace casing and structure 10 (with some transparent walls for clarity) with an air filter 12, a drive 14 for rotating the air filter 12, an air filter bearing 16, a bearing and drive support bracket 80, a dust collecting plenum 28, a dust collecting blower 32, a dust transport duct 30, a primary air circulation blower 18, a heat exchanger 22, a combustion chamber 20, a fuel inlet 34, a circulating air outlet plenum 26, an exhaust vent 24, as well as a control circuit not shown. Whenever the combustion chamber is operating, the filter drive 14 will drive the rotating filter to permit all sectors of the rotating filter 12 to be subjected to the reverse air flow from the interior downstream face of the rotating filter 12 toward the upstream exterior surface so that the dust particles deposited there are dislodged and sucked into the inlet of the dust collecting plenum 28, and through the dust collecting blower 32 and dust transport duct into the combustion chamber 20. As a result the rotating filter 12 will remain clean and the heat from the heat exchanger 22 will be effectively convected by the full, unobstructed air flow. The rigidity of the filter can be achieved by the use of any of rigid filter materials of suitable porosity or a composit of non rigid filter materials and rigid materials.

FIG. 2 shows a simplified view of hot-air furnace with another embodiment of the self-cleaning filter system comprising a warm-air furnace case and structure 10, a rotating filter 12, a filter drive 14, a filter drive support bracket 82, a filter bearing 16, a circulating air blower 18, a combustion chamber 20, burners 40, a heat exchanger 22, an exhaust vent pipe (flue) 24, a circulating air outlet 26, a dust collecting plenum 28, a dust transport duct 30, and a dust collecting blower 72. These components are arranged in the warm-air furnace such that the circulating return air is drawn through the rotating filter 12 into the interior of the furnace case 10 by the action of circulating air blower 18 such that airborne dust is deposited on the exterior, upstream surface of the rotating filter 12. As the filter 12 rotates past the dust collecting plenum the negative pressure generated by the dust collecting blower 72 causes the dust previously deposited on the exterior, upstream surface of the rotating filter 12, to be dislodged from the filter 12 surface and drawn into the inlet of the dust collecting plenum 28 and into the dust collecting blower 72 and then forced through the dust transporting duct 30 and into the exhaust vent pipe 24 at a total pressure higher than the static pressure within the exhaust vent pipe 24 at that point. Thus, the airborne dust from the rotating filter 12 is entrained in the exhaust gas flow and harmlessly ejected into the ambient with the furnace exhaust gas such that the rotating filter 12 is kept clean and the air flow through the rotating filter 12 is relatively unobstructed into the plenum and through the circulating air blower 18 and, past the heat exchanger 22 at a rate that is high enough to efficiently transfer heat from the heat exchanger to the heated spaces as required.

FIG. 3 shows another embodiment of this invention in which the airborne particulates are deposited in a cleansible or disposable dust receptacle. The functional components comprise a hot-air furnace case and structure 10, a rotating filter 12, a filter drive 14, a circulating air blower 18, a combustion chamber 20, a heat exchanger 22, an exhaust vent pipe (flue) 24, a circulating air outlet 26, a dust collecting plenum 28, a dust transporting duct 30, a gas supply manifold 34, a gas burner 40, a dust disposal means selected from a group consisting of a cleanable dust receptacle and a disposable dust receptacle 62, a pressurizing blower 74, a pressure plenum 76 and a filter and filter drive support bracket 82. These components are so constructed and installed that they interact to cause the rotating filter 12 to be cleaned by the action of the reversed pressure gradient which is generated from the downstream, interior surface of the rotating filter 12 to the front, exterior surface by the action of the pressurizing blower 74 which pressurizes the pressure plenum 76 which is adjacent to the downstream surface of the rotating filter 12 and opposite the dust collecting plenum 28 which is immediately adjacent to the exterior, upstream surface of the rotating filter 12 so that the dust collecting plenum 28 gathers the dust particles that are dislodged from the outer exterior surface of the rotating filter by the air flow from the aforesaid pressuring blower 72 and pressure plenum 76. The dust bearing air flow is directed from the dust collecting plenum 28 into the dust transporting duct 30 and deposited into a dust disposal means selected from a group consisting of a cleanable dust collecting receptacle and a disposable dust collecting receptacle. As a result, the air flow through the constantly clean rotating filter 12 is relatively unobstructed to flow through the air circulating air blower 18, the cooled side of the heat exchanger 22, and into the circulating air system through the circulating air outlet 26 at a sufficiently high rate to efficiently transport heat as needed.

FIG. 4 shows another embodiment of this invention in which the airborne particulates are deposited into the combustion chamber. The functional components comprise a warm-air furnace case and structure 10, a rotating filter 12, a filter drive 14, a filter bearing 16, a circulating air blower 18, a combustion chamber 20, a heat exchanger 22, an exhaust vent pipe (flue) 24, a circulating air outlet 26, a dust collecting plenum 28, a dust transporting duct 30, an upstream dust transporting duct 38, a fuel supply manifold 34, a gas burner 40, a drive motor 52, a speed reducer 54, a drive belt 56, a dust collecting blower 32, and a filter and filter drive support bracket 82. These components are so constructed and installed that they interact to cause the rotating filter 12 to be cleaned by the action of the reversed pressure gradient which is generated from the rear, interior surface of the rotating filter 12 to the front, exterior surface by the suction action of the dust collecting blower 32 which is downstream of the dust collecting plenum 28 and upstream of the dust transporting duct 30. The dust bearing air flow is drawn from the dust collecting plenum 28 through upstream duct 38 and through the dust collecting blower and downstream dust transporting duct 30 and deposited into the combustion chamber 20. As a result, the air flow through the constantly clean rotating filter 12 is relatively unobstructed to flow through the air circulating air blower 18, the cooled side of the heat exchanger 22, and into the circulating air system through the circulating air outlet 26 at a sufficiently high rate to efficiently transport heat as needed. The airborne dust is harmlessly burnt in the combustion chamber with the minute products of combustion ejected out through the exhaust vent pipe (flue) 24.

FIG. 5A shows some relevant details of the combustion chamber 20 of a gas furnace with the dust transport tube 30, the gas inlet manifold 34, a gas transfer tube 42, the gas burner 40 with primary air shutter 43, pilot light and pilot light controls. Other details of conventional gas furnaces are not shown. The assembled parts act together to operate like conventional gas furnaces except for combustion of airborne dust from dust transport tube 30. The gas from the gas transfer tube 42 and the primary air flowing in through the primary air shutter 43 mix in the burner and flow out through openings in the burner 40. Ignition is achieved by electrical spark or pilot valve as in conventional gas furnaces. The airborne dust from the dust transport tube 30 is burnt in the gas flames as required in this embodiment of the invention.

FIG. 5B shows some details of an oil burner for one embodiment of this invention with the dust transport tube 30, an oil atomization nozzle 44, an outer burner tube 45, a primary air blower 46, an oil supply tube 47, a primary air transport tube 48, an oil pressurizing pump 49, an oil transfer tube 50. The oil is pressurized by the oil pressuring pump 49 to approximately 100 psi (689 kPa) or more. The high pressure oil is atomized as it exits the nozzle 44 and forms a mixture with the surrounding primary air flow from the air transport tube 48. The secondary air flow flows into the outer burner tube 45 by action of the dust transport blower and the induction effect of the high speed oil droplet-air mixture at the outlet of the outer burner tube 45. The airborne dust from the dust transport tube 30 is mixed with, and burnt within, the oil-air mixture which is ignited by conventional ignition means not shown. Thus, the dust from the surface of the rotating filter 12 is consumed in a simple and convenient manner as required.

FIG. 6 shows a fluid-dynamic drive for the rotating filter 12 which is mounted on a low friction bearing 88 which is supported by a support 86, a set of stators are supported immediately upstream of the rotating filter 12, with a gap preferably less than an inch but more than 0.20 of an inch. In a space provided between a portion of the stators 90 a dust collecting plenum 28 is placed adjacent to the upstream exterior surface of the rotating fan 12. Air flowing into the furnace is first deflected by the stators and the resultant tangential component of the kinetic energy of the air flow acts to exert a torque upon the rotating filter 12 to cause it to slowly rotate around the low friction filter bearing 88 as required to permit all sectors of the rotating filter 12 to be subjected to the reverse air flow from the interior downstream face of the rotating filter 12 toward the upstream exterior surface so that the dust particles deposited there are dislodged and blown into the inlet of the dust collecting plenum 28 by the suction effect of the dust collecting blower 32 and on toward a dust disposal means described elsewhere herein.

FIGS. 7 and 7A show a fluid-dynamic drive for the rotating filter 12 which is mounted on a low friction bearing 88 which is supported by a bracket or brackets, not shown here, a set of rotors 94, which are mounted on the rotating filter 12. A dust collecting plenum not shown here is placed adjacent to the upstream, exterior, surface of the rotating filter so that the air flowing into the furnace is deflected by the rotors and the resultant tangential deflection of air flow generates an opposite reaction to exert a torque upon the rotating filter around the low friction filter bearing 88 as required to permit all sectors of the rotating filter to be subjected to the reverse air flow from the downstream face of the rotating filter 12 toward the upstream exterior surface so that the dust particles deposited there are dislodged and blown into the inlet of the dust collecting plenum 28 shown elsewhere and on toward the dust disposal means described elsewhere herein.

FIG. 8 is a sectional cross section showing another embodiment of this invention in which the reverse air flow originates from the primary circulating air blower 18. The functional components comprise a hot-air furnace case and structure 10, a rotating filter 12, a filter drive means 58, a filter bearing 16, a circulating air blower 18, a combustion chamber 20, a heat exchanger 22, an exhaust vent pipe (flue) 24, a circulating air outlet 26, a dust collecting plenum 68, a dust transporting duct 70, a gas supply manifold 32, a gas burner 40, a blower pressure tap plenum 66, and a filter and filter drive support bracket 86 to support the filter and the filter drive means 58.

Figure 1:
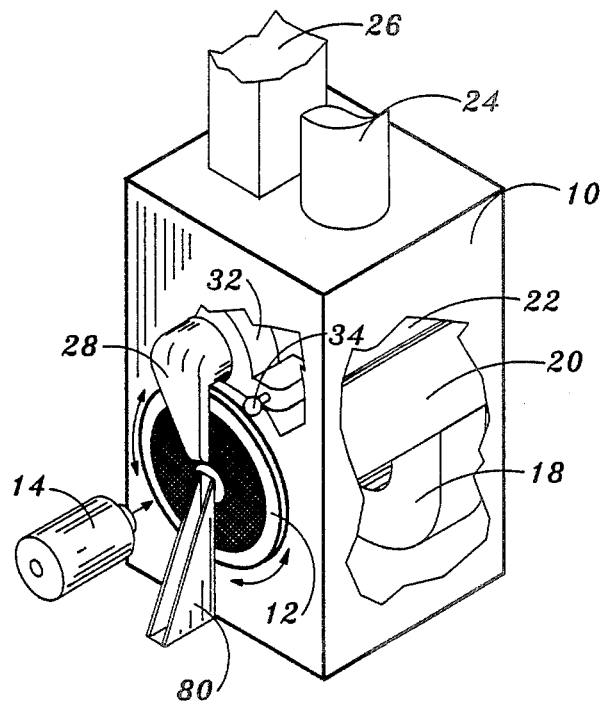
FIG. 1 is a simplified perspective of a hot-air furnace with transparent furnace walls for clarity of illustration and a combustion chamber destination of dust.
Figure 2:
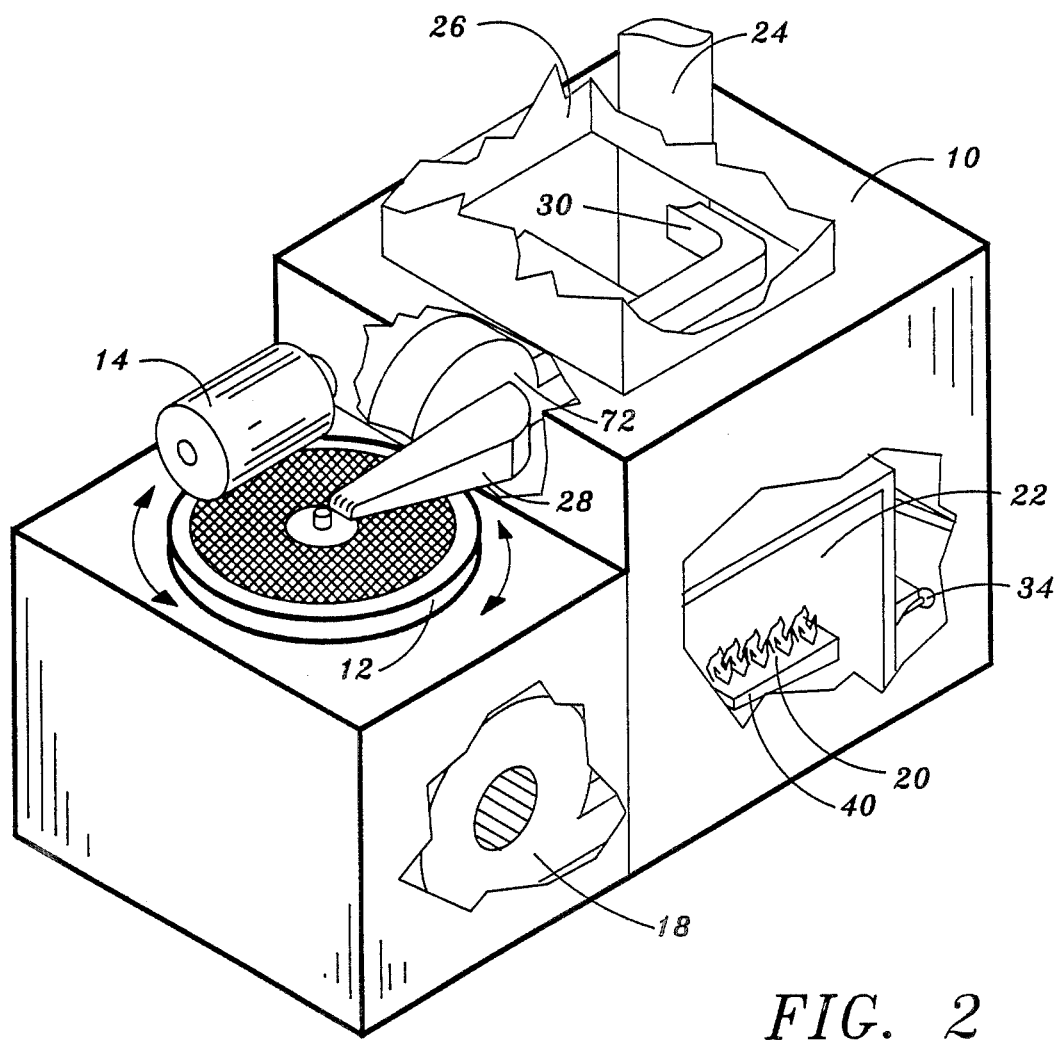
FIG. 2 is a simplified cross sectional view of hot-air furnace with exhaust vent (flue) injection duct.
Figure 2A:
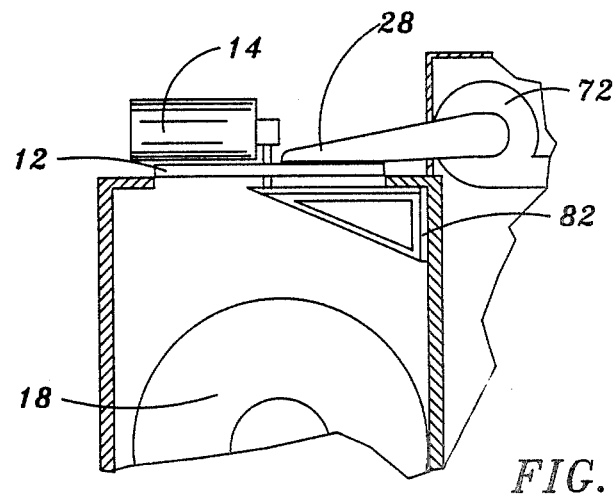
Figure 3:
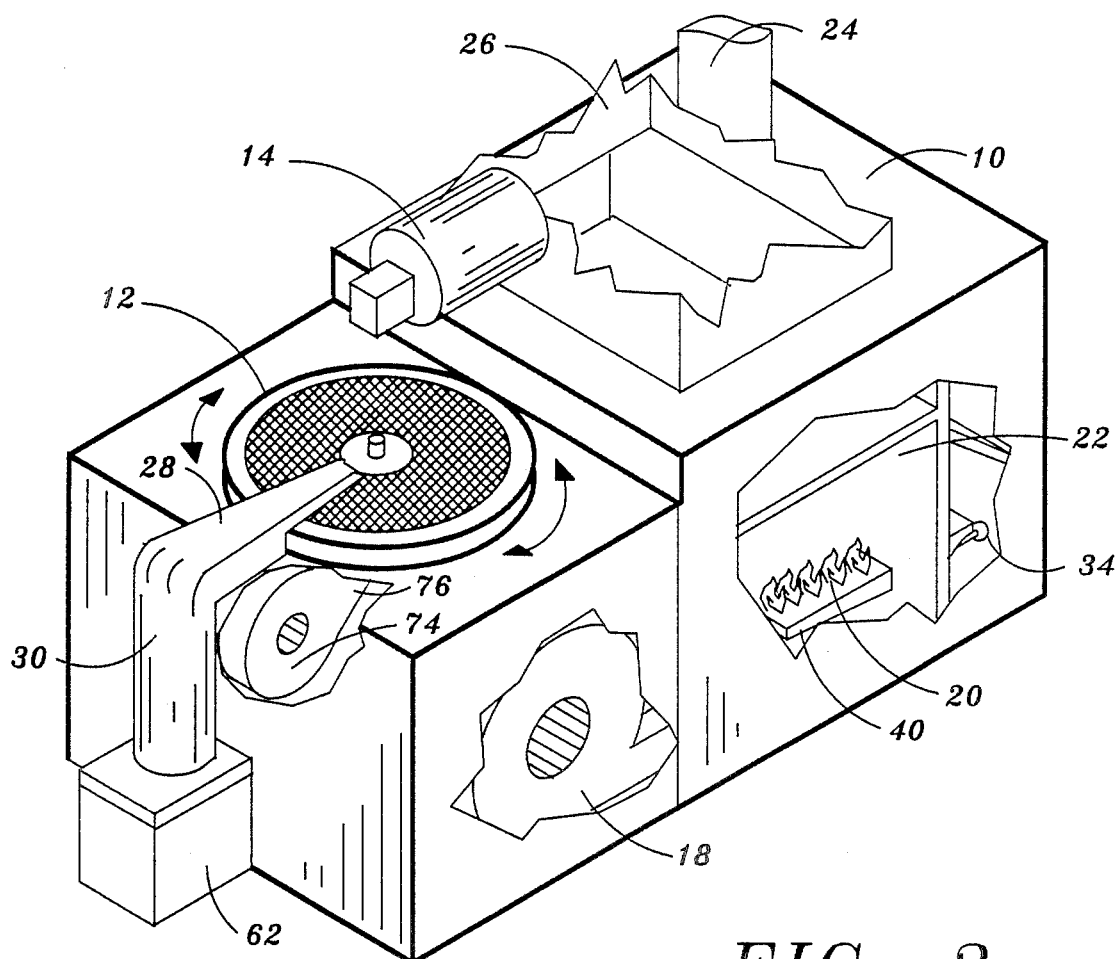
FIG. 3 is a simplified cross sectional view of hot-air furnace with dust receptacle.
Figure 3A:
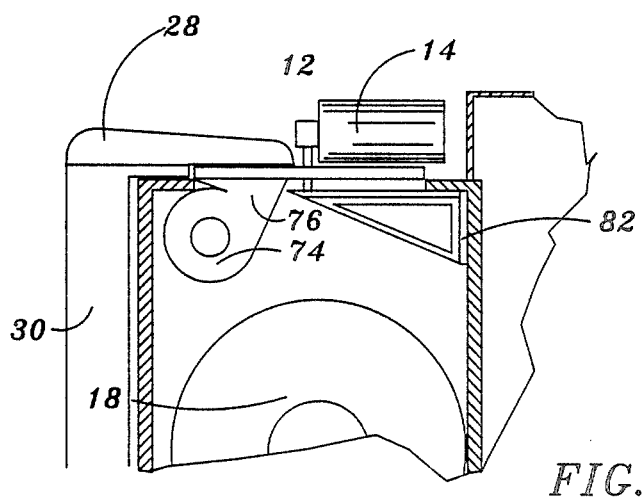
FIG. 3A is a partial side sectional view of FIG. 3 inserted.
Figure 4:
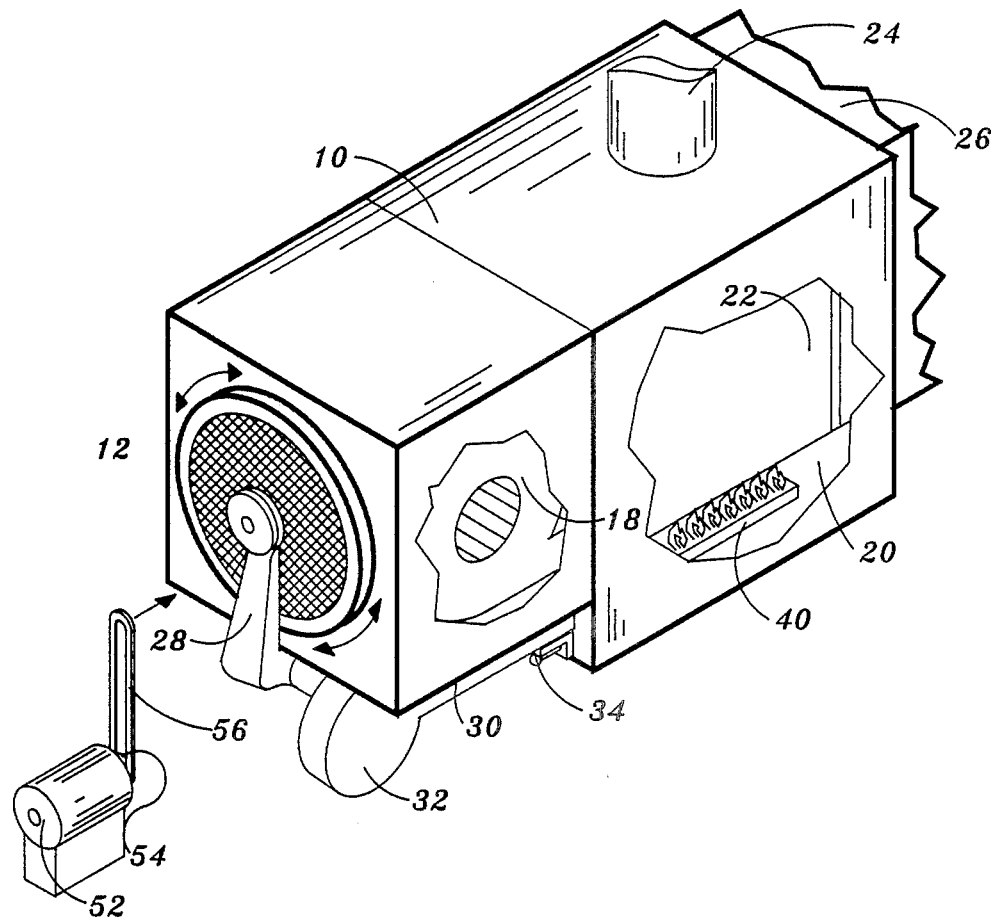
FIG. 4 is a simplified cross sectional view of hot-air furnace with combustion chamber destination for airborne dust.
Figure 5A:
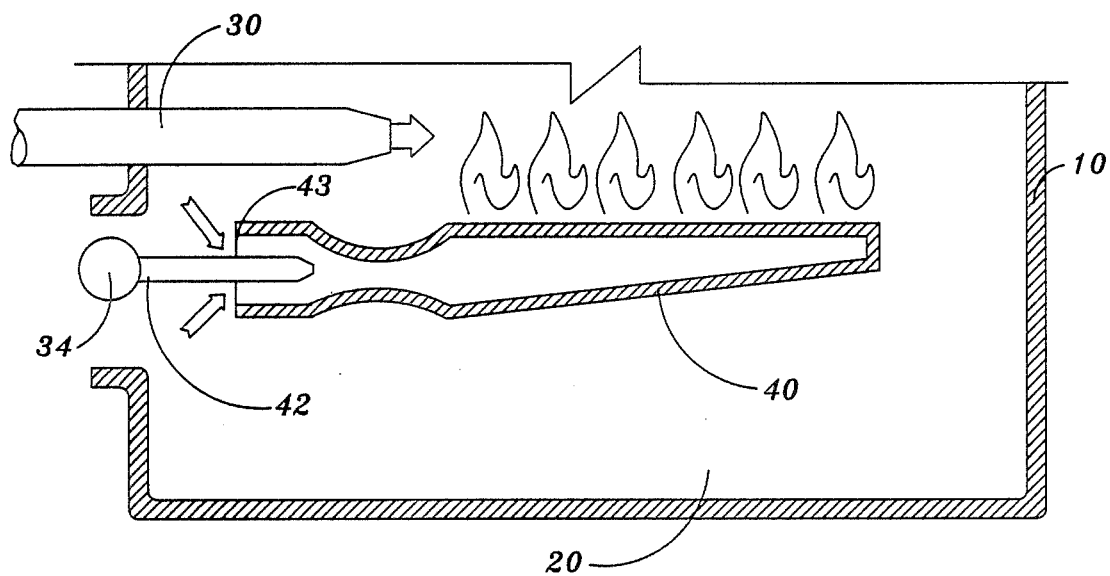
FIG. 5A shows a partial enlarged sectional view of FIG. 5.
Figure 5B:
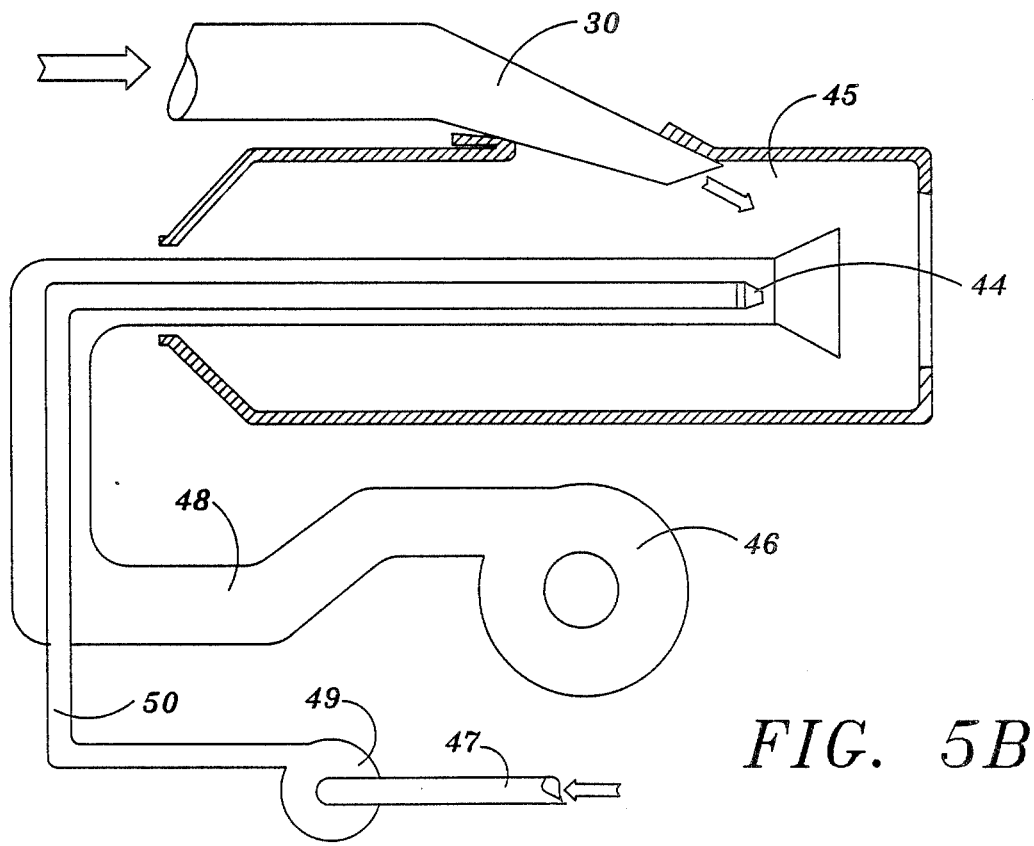
FIG. 5B shows a modification wherein the dust transport tube is connected to an oil burner.
Figure 8:
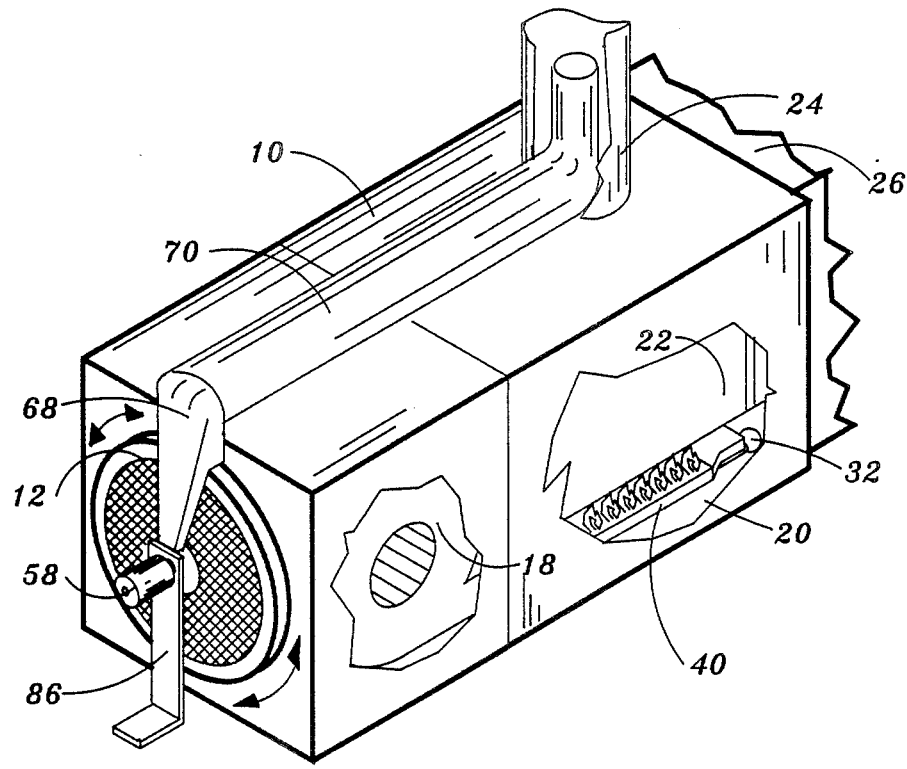
FIG. 8 shows a filter cleaning system with air pressure tap from the primary circulating air blower.
Figure 8A:
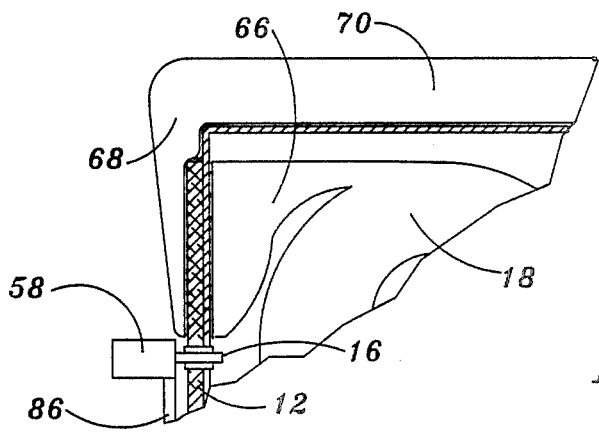

The above identified components of this embodiment so interact that relatively high pressure air from the circulating air blower 18 flows through the blower pressure tap plenum 66 through the rotating filter 12 from which dust is dislodged and into the inlet of the dust collecting plenum 68, and through the dust transport duct which directs the dust-laden air into the exhaust vent (flue) 24 at a total stream pressure greater than the stream pressure within the exhaust vent (flue) 24 and where dust is mixed with the flue gas and harmlessly expelled with the flue gas. As a result the rotating air filter 12 is kept clean so that the air flow through the rotating air filter 12 is relatively unobstructed to flow through the heat exchanger at a rate sufficient to efficiently transport heat from the heat exchanger 22 and into the regions requiring heat. The filter drive will stop when the combustion chamber fuel flow is arrested to avoid injecting any dust into a quiescent exhaust vent (flue) 24.

Figure 9:
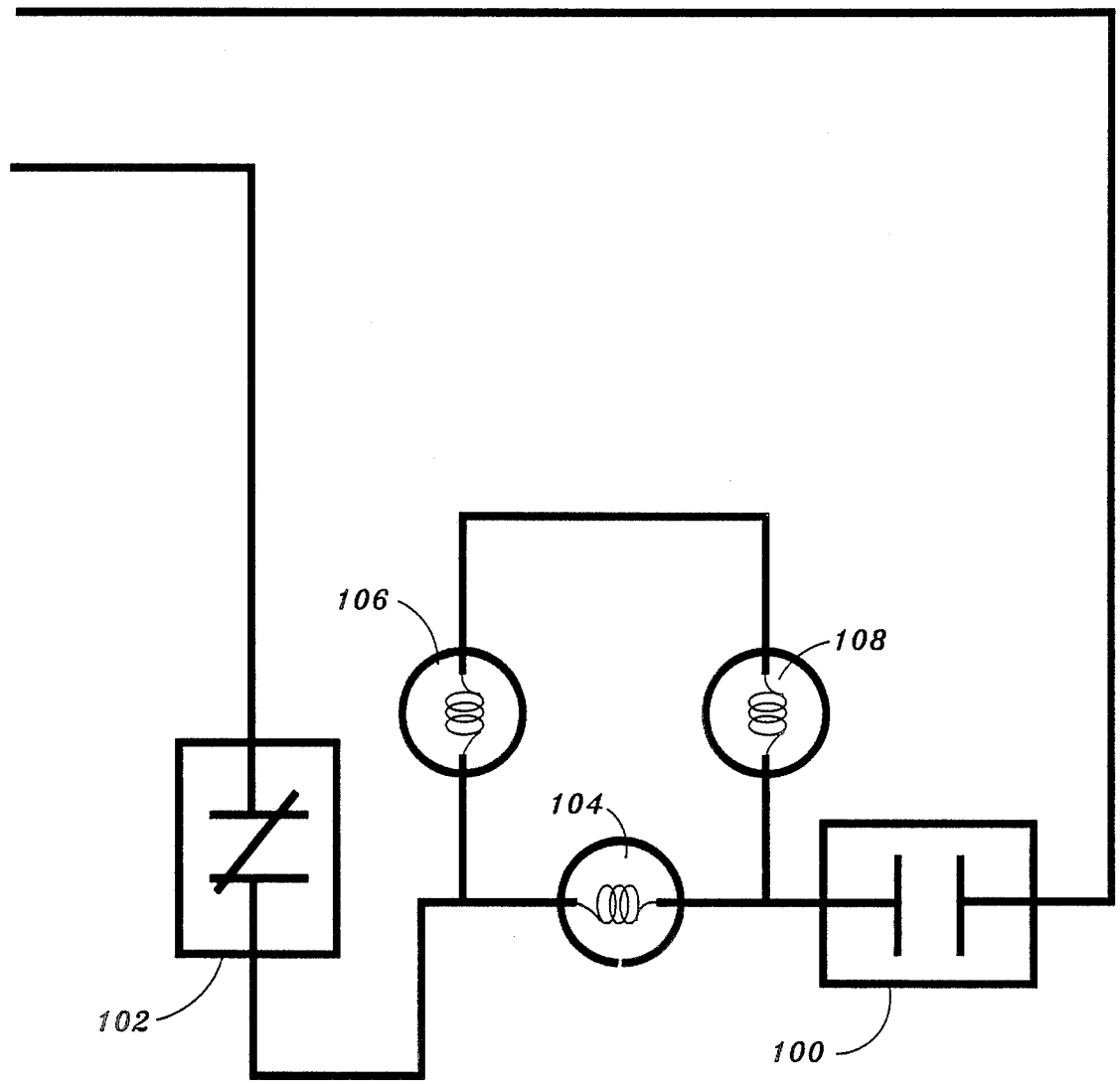
FIG. 9 shows a control circuit.

The control system as shown in one embodiment in FIG. 9 comprises a thermostatic fan control 100, a resettable thermostatic fire detection switch 102 (sometimes called a "Fire-Stat"), a circulating fan motor 104, a dust collecting fan motor 106, a filter drive motor 108, as well as an electrical power source and required wiring. The thermostatic fan control 100 is actuated by a high heat exchanger temperature, approximately 150° F. (65.6° C.), which indicates that the burners are "ON" and actuated "OFF" when the heat exchanger temperature drops to approximately 100° F. (37.8° C.) or lower. The fire detection switch (Fire-Stat) 102 deactivates the blower motor 104 when the return air temperature is approximately 160° F. (71.1° C.) or higher to prevent the stimulation of a fire in the building or duct system.

That which is claimed is:

1. A system for removing particulate matter from a warm-air furnace filter, the warm-air furnace comprising a casing having an air inlet opening, an essentially rigid planer circular disc air filter mounted in said air inlet opening, a means for rotating said air filter, an air filter bearing, a bearing support means, a dust collecting plenum connected to a dust transporting duct, a reverse air pressure gradient generating means for causing air to flow from said collecting plenum to said dust transporting duct, means forming an air plenum in said casing circulation driving means in said casing for drawing air through said opening into said casing and through a heat exchanger in said casing, means forming a combustion chamber in said casing, burner means in said combustion chamber a circulating air outlet in said casing for discharging air from said heat exchanger an exhaust connected to said combustion chamber vent means, and dust disposal means connected to said dust transporting duct selected from a group consisting of an inlet to said combustion chamber, and an injection duct, in said exhaust vent means so arranged that:

said essentially rigid planar circular disc air filter is at said inlet opening in said casing to said air plenum which is just upstream of said system air circulation driving means and such that said dust collecting plenum is immediately adjacent and open to the upstream face of said essentially rigid planer circular disc air filter and upstream of, and directly connected to, said dust transporting duct and such that said air filter bearing directly supports said essentially rigid planar circular disc air filter and said combustion chamber is situated directly upstream of said heat exchanger which, in turn, is upstream of said exhaust vent means, such that:

dust-laden air flows through said essentially rigid planar circular disc air filter upon which the dust particles are deposited, and downstream of which the filtered air is drawn through said air plenum into said system air circulation driving means and through said heat exchanger and out through said circulating air outlet, while said essentially rigid planar circular disc air filter is constantly rotating and being driven by said filter rotating means such that each sector of said essentially rigid planar circular air filter is rotated to close proximity to the inlet of said dust collecting plenum which is placed in the upstream, exterior side of said air filter and which has an inlet pressure which is lower than pressure on the interior, or downstream face of that sector of said air filter, a reverse air pressure gradient being thus generated such that the resulting reverse air flow from the interior, downstream face of said air filter toward the upstream, exterior surface of said air filter thereby dislodges dust particles from that sector of said air filter in the vicinity of said dust collecting plenum and into said dust collecting plenum and from there into said dust transporting duct into the dust disposal means selected from said group consisting of said combustion chamber and inlet, said exhaust vent injection duct such that full air flow is maintained through said air filter which is kept continually clean, and through said heat exchanger and said circulating air outlet for improved heat transfer efficiency and energy conservation.

2. A system for removing particulate matter from a warm-air furnace filter as claimed in claim 1, comprising a dust collector blower downstream of said dust collecting plenum, and upstream of said combustion chamber air inlet such that the air pressure in said dust collecting plenum is lower than the pressure within said furnace plenum downstream of said filter such that air flows in a reverse direction from the downstream, interior face of said air filter toward the upstream, exterior face of said air filter and drives dust from the upstream, exterior face of said air filter into said dust collecting plenum and through said dust collector blower into the air inlet of said combustion chamber.

3. A system for removing particulate matter from a warm-air furnace filter as claimed in claim 1 comprising a drive means which consists of a set of stator blades immediately upstream of said air filter such that the incoming air is diverted in a tangential direction relative to said air filter so that the diverted air flow generates sufficient torque upon said air filter that said air filter is caused to rotate about said air filter bearing so that each sector of said air filter is periodically exposed to a reversed air flow to dislodge dust from said rotating air filter into said dust collecting plenum and into said dust collecting transport duct.

4. A system for removing particulate matter from a warm-air furnace filter as claimed in claim 1 wherein said dust disposal means comprises a dust collector blower downstream of said dust collector plenum and said exhaust vent injection duct to arranged that dust-laden air is drawn through said dust collector plenum into said dust collector blower and from thence into said exhaust vent injection duct which directs the dust-laden air into said exhaust vent at a higher total pressure than that which is maintained within said exhaust vent and in the general direction of flowing exhaust gas.

5. A system for removing particulate matter from a warm-air furnace filter as claimed in claim 1 comprising a drive means which consists of a set of rotor blades which are structurally integrated to said filter such that the incoming air is diverted in a tangential direction relative to said air filter so that the diverted air flow generates sufficient torque by reaction of the deflected air flow such that said air filter is caused to rotate about said air filter bearing so that each sector of said air filter is periodically exposed to the reversed air flow through said filter to transfer dust from said filter into said dust collecting plenum and into said dust collecting transport duct.

6. A system for removing particulate matter from a warm-air furnace as claimed in claim 1 wherein the reversed air pressure gradient generating means comprises a circulating blower forming said system air circulation driving means a circulating blower pressure tap plenum between the downstream section of said circulating blower and the downstream face of said rotating filter opposite to, and in the immediate vicinity of, said dust collecting plenum, said elements interact such that the relatively high pressure air from downstream section of said circulating blower flows through said circulating blower pressure tap plenum and into and through said rotating filter in a reversed downstream-to-upstream direction with sufficient kinetic energy to dislodge the particulate matter from said rotating filter and into said dust collecting plenum and from there to flow through said dust transport means to one of said selected dust disposal means.

7. In a warm-air furnace, including a rotating circular disc filter, a process for constant cleaning of said rotating circular disc filter comprising the forcing of dust-laden return air through said rotating circular disc filter such that the dust is deposited in the upstream portion of the filter media and the periodic exposure of a sector of said rotating circular disc filter to a region of reversed air pressure which causes locally reversed air flow which acts to dislodge the particulate matter from said rotating circular disc filter such that said dislodged particulate matter is collected and driven to a location of dust disposal, said elimination being accomplished by a process selected from the group consisting of burning in a combustion chamber of said warm-air furnace or ejecting into a flue gas exhaust stream from a combustion chamber of said warm-air furnace.

* * * * *